United States Patent
Sawai

(10) Patent No.: US 7,215,242 B2
(45) Date of Patent: May 8, 2007

(54) VEHICULAR BURGLAR-PROOF SYSTEM

(75) Inventor: Tsurugi Sawai, Kobe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 142 days.

(21) Appl. No.: 11/072,306

(22) Filed: Mar. 7, 2005

(65) Prior Publication Data

US 2005/0212664 A1 Sep. 29, 2005

(30) Foreign Application Priority Data

Mar. 25, 2004 (JP) ............................. 2004-088861

(51) Int. Cl.
*B60R 25/10* (2006.01)
(52) U.S. Cl. ............................. 340/426.28; 340/426.1; 340/426.22; 340/426.29
(58) Field of Classification Search . 340/426.1–426.26
See application file for complete search history.

(56) References Cited

U.S. PATENT DOCUMENTS 5,805,054 A * 9/1998 Baxter .................... 340/426.11
6,734,788 B1 * 5/2004 Winner .................... 340/426.1

FOREIGN PATENT DOCUMENTS

JP 7-047928 2/1995

* cited by examiner

*Primary Examiner*—Brent A. Swarthout
(74) *Attorney, Agent, or Firm*—McDermott Will & Emery LLP

(57) ABSTRACT

A vehicular burglar-proof system includes (i) a plurality of alarm unit, (ii) a detection unit for detecting movement, opening, and closing of a movable body, and (iii) a control unit connected to the plurality of alarm unit and the detection unit. A predetermined operation of the movable body allows the control unit to turn off the plurality of alarm unit or change the alarm unit into a predetermined alarming state. This structure can provide a user-friendly vehicular burglar-proof system in which an alarming state can easily be selected according to the use.

11 Claims, 5 Drawing Sheets

VEHICULAR BURGLAR-PROOF SYSTEM

BACKGROUND OF THE INVENTION

1. Field of the Invention

The present invention relates to a burglar-proof system for a vehicle used to prevent theft mainly in an automobile.

2. Background Art

Recent years, there has been an increasing number of vehicles each incorporating a vehicular burglar-proof system for preventing theft of articles inside of the body or cabin of a parked vehicle by flashing the headlights or blowing the horn when a door of the vehicle is unlocked or opened/closed by a forged key or tools.

A conventional vehicular burglar-proof system is described with reference to FIG. 5.

FIG. 5 is a block diagram of a conventional vehicular burglar-proof system. In the drawing, lamps (headlights) 1A for radiation of light in the front direction of a vehicle, buzzer 1B installed in the cabin of a vehicle, and alarming horn 1C form alarm unit 1.

Further, the system includes door knob 2A for opening/closing a door, locking knob 2B for locking/unlocking the door, key cylinder 2C for receiving a key when the engine is started. Each of these components has a switch for detecting the movement or opening/closing of the component and form detection unit 3.

Then, these alarm unit 1 and detection unit 3 are electrically connected to control unit 4 of the vehicle formed of electronic components, such as microcomputers, to form a vehicular burglar-proof system.

Cntrol unit 4 has changeover switches each for selecting one from a plurality of alarm unit 1. In FIG. 5, three changeover switches are provided. Changeover switch 41 is a switch for determining whether or not to select lamps 1A as an alarm unit. Changeover switch 42 is a switch for determining whether or not to select buzzer 1B as an alarm unit. Changeover switch 43 is a switch for determining whether or not to select horn 1C as an alarm unit. When a changeover switch is turned on (energized), a predetermined alarm unit is selected. When a changeover switch is turned off (not energized), a predetermined alarm unit is not selected. In FIG. 5, only horn 1C is selected by changeover switch 43 as an alarm unit.

In a vehicle incorporating a so-called keyless entry system in which a driver holds a card or a portable unit including a key (not shown) and locks/unlocks doors by communication between the card or the portable unit and a vehicle, a communication unit (not shown) for communicating with the portable unit held by the driver is provided in the vehicle. The communication unit is connected to a drive unit (not shown) for operating locking knob 2B, such as a motor, and to control unit 4.

To prevent theft, predetermined alarming states, such as flashing lamps 1A, sounding buzzer 1B, and blowing horn 1C, are set in control unit 4.

In the above structure, when a driver operates the portable unit, or goes at a predetermined distance away from the vehicle after getting off the vehicle and closed the door, an inherent code is transmitted, as a radio signal, from the portable unit to the vehicle. Then, the communication unit in the vehicle receives the code and determines if it is a correct code inherent to the vehicle or not. When the code is correct, the drive unit, such as a motor, operates locking knob 2B and locks the doors.

When a driver comes near to the vehicle and operates the portable unit, or enters within a predetermined range of distance from the vehicle, the portable unit transmits a radio signal similarly. Then, the communication unit receives the signal, and the doors are unlocked.

Further, when a driver leaves a parked vehicle with its doors locked, and a person other than the driver opens/closes or unlocks one of the doors using a forged key or tools, detection unit 3 detects that the door is opened/closed, door knob 2A is operated, or locking knob 2B is unlocked even though communication is not made between the communication unit and the portable unit. Control unit 4 detects this detection.

Then, control unit 4 operates to provide a predetermined alarming state, such as blowing horn 1C. This draws attention of surroundings and prevents theft in a parked vehicle.

Known as one of prior art references of this application is Japanese Patent Unexamined Publication No. H07-47928.

However, in the conventional vehicular burglar-proof system, the alarming state is predetermined, such as blowing horn 1C only. For this reason, to select individual alarming states according to the use of the driver of a vehicle, the changeover switches of alarm unit, i.e. lamps 1A, buzzer 1B, and horn 1C, are required. This increases the number of constituent components of the burglar-proof system. Further, because changeover switches are generally provided in obscure and user-unfriendly positions, changeover requires a large labor.

SUMMARY OF THE INVENTION

The present invention addresses these conventional problems, and aims to provide a user-friendly vehicular burglar-proof system with a simple structure.

To attain the objective, the present invention structures a vehicular burglar-proof system so that a predetermined operation of a movable body, such as a door knob and locking knob, allows a control unit to turn off alarm unit or switch the alarm unit into a predetermined alarming state. This structure can provide a vehicular burglar-proof system in which an alarming state can easily be selected according to the use.

DETAILED DESCRIPTION OF THE INVENTION

An exemplary embodiment of the present invention is described hereinafter with reference to FIG. 1

First Embodiment

Figure 1:
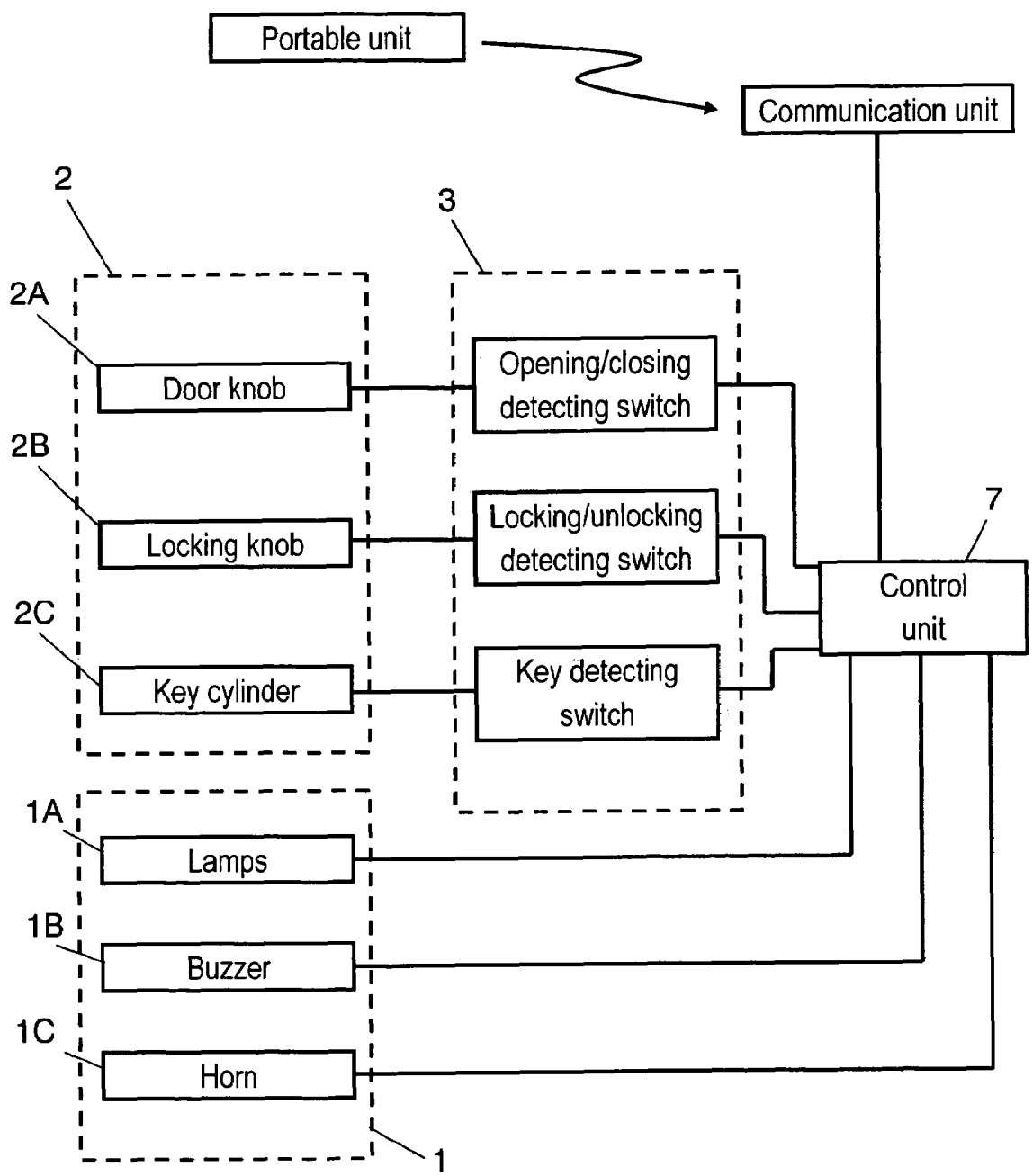
FIG. 1 is a block diagram of a vehicular burglar-proof system in accordance with a first exemplary embodiment of the present invention.

FIG. 1 is a block diagram of a vehicular burglar-proof system in accordance with the first exemplary embodiment of the present invention. In the drawing, lamps (headlights) 1A for radiation of light in the front direction of a vehicle, buzzer 1B installed in a cabin of the vehicle, and alarming horn 1C form alarm unit 1. The alarm unit are not limited to the above components. For example, room lamps inside of the vehicle, light emitting diodes on the instrument panel can also be used.

Further, the system includes door knob 2A for opening/closing a door, locking knob 2B for locking/unlocking the door, key cylinder 2C for receiving a key when the engine is started. These components form movable bodies 2 capable of undergoing an opening/closing or moving operation, including depressing/pulling or inserting/drawing.

Further, switches, sensors each for detecting the moving or opening/closing operation, or other components are attached to these movable bodies 2, to form detection unit 3. Then, these detection unit 3 and alarm unit 1 are electrically connected to control unit 7 of the vehicle made of electronic components, such as microcomputers, to form a vehicular burglar-proof system.

In FIG. 1, what is different from the block structure of the conventional vehicular burglar-proof system is that this control unit 7 has no changeover switches added thereto. Further, this vehicular burglar-proof system is structured so that a predetermined operation of movable body 2, such as door knob 2 and locking knob 2, allows control unit 7 to turn off alarm unit 1, such as lamps 1A, buzzer 1B, and horn 1C, or switch the alarm unit into a predetermined alarming state. In other words, for the conventional system, the alarm unit are selected using changeover switches 41, 42, and 43. However, for a vehicular burglar-proof system of the present invention, a predetermined operation can select an alarm unit without using such changeover switches.

Figure 2:
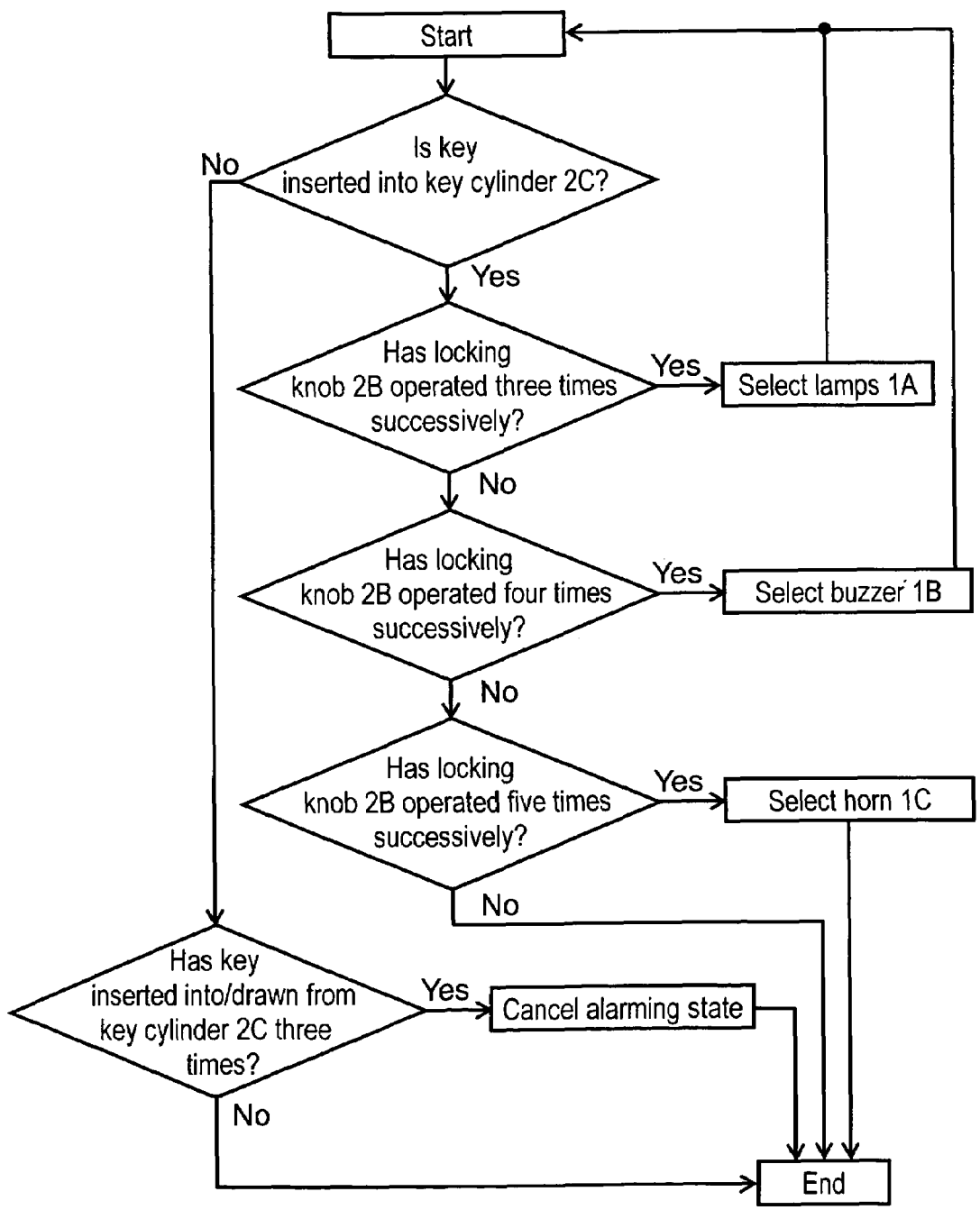
FIG. 2 is an example of a flowchart showing an operation procedure for setting alarming states of the vehicular burglar-proof system of the present invention.

For example, operating locking knob 2B three times successively with a key inserted into key cylinder 2C can change the alarming state to lamps 1A. Operating locking knob 2B four times with the key inserted into key cylinder can change the alarming state to buzzer 1B. Operating locking knob 2B five times with the key inserted into key cylinder can change the alarming state to horn 1C. Further, when the key is inserted into/drawn from key cylinder 2C three times, the alarming states are cancelled. FIG. 2 shows an example of a flowchart showing the procedure of this operation.

Incidentally, room lamps or light emitting diodes on the instrument panel can be kept flashed after an alarming state is set. If a vehicular burglar recognizes the flushing as an alarming state, a crime can be prevented beforehand.

Such a vehicular burglar-proof system is incorporated in a vehicle. Additionally provided is a communication unit for communicating with a card or a portable unit with a key held by a driver. This communication unit is connected to a driving means (not shown) for operating locking knob 2B, such as a motor, and control unit 7, to form a vehicle incorporating a so-called keyless entry system.

In the above structure, when a driver operates the portable unit, or goes at a predetermined distance away from the vehicle after getting off the vehicle and closed the door, an inherent code is transmitted, as a radio signal, from the portable unit to the vehicle. Then, the communication unit in the vehicle receives the code and determines if it is a correct code inherent to the vehicle or not. When the code is correct, the drive unit, such as a motor, operates locking knob 2B and locks the doors.

When a driver comes near to the vehicle and operates the portable unit, or enters within a predetermined range of distance from the vehicle, the portable unit transmits a radio signal similarly. Then, the communication unit receives the signal and the doors are unlocked.

Further, when a driver leaves a parked vehicle with its doors locked and a person other than the driver opens/closes or unlocks one of the doors using a forged key or tools, detection unit 3 detects that the door is opened/closed, door knob 2A is operated, or locking knob 2B is unlocked even though communication is not made between the communication unit and the portable unit. Control unit 7 detects this detection.

Then, control unit 7 operates to provide an alarming state set by the driver of the vehicle, such as sounding buzzer 1C. This draws attention of surroundings and prevents theft in a parked vehicle. The buzzer can be sounded continuously; however, intermittently sounding the buzzer is more effective.

A driver leaves a parked vehicle with the portable unit held by him/her, and his/her family member may want to open the door with a key, or the driver may not want the vehicle parked in his/her garage to make loud noise at night. In such a case, as described above, the driver can operate locking knob 2b two times successively to switch the alarming state to lamps 1A, or insert the key into and draws it from key cylinder 2C three times to cancel the alarming state.

As described above, in this embodiment, a vehicular burglar-proof system is structured so that a predetermined operation of movable body 2, such as door knob 2A and locking knob 2B, allows control unit 7 to turn off alarm unit 1 or change the alarm unit into a predetermined alarming state. This structure can provide a user-friendly vehicular burglar-proof system in which an alarming state can easily be selected according to the use.

Figure 3:
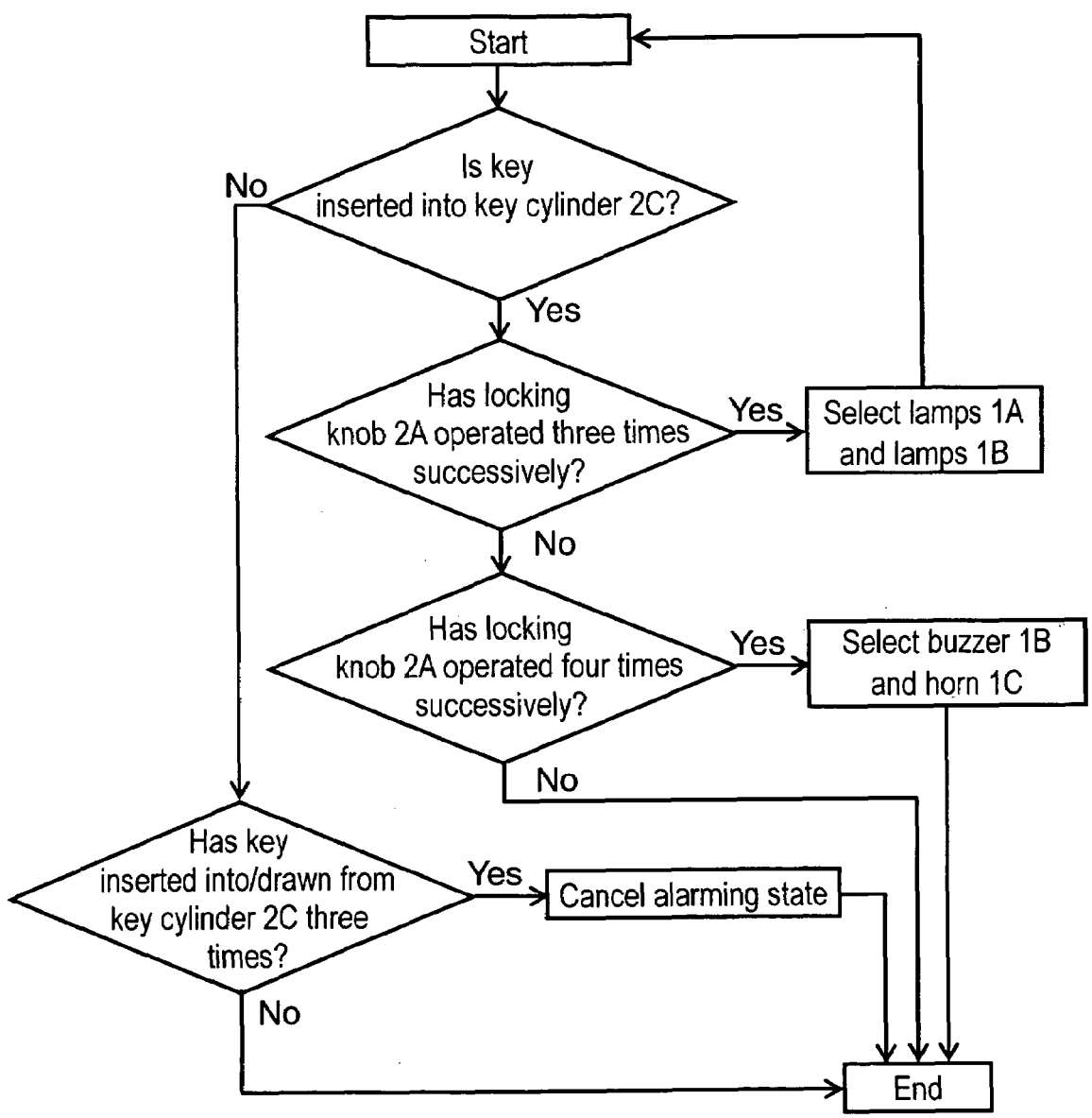
FIG. 3 is another example of a flowchart showing an operation procedure for setting alarming states of the vehicular burglar-proof system of the present invention.

The operation of locking knob 2B changes the alarming states into each of lamps 1A, buzzer 1B, and horn 1C as described above. In addition, predetermined operations of movable body 2 allow control unit 7 to combine a plurality of alarm unit 1. For example, three successive operations of door knob 2A combine lamps 1A and buzzer 1B. Four successive operations of door knob 2A combine lamps 1A and horn 1C. These combinations can provide alarming states capable of providing higher burglar-proof effects. FIG. 3 shows an example of a flowchart showing the procedure of this operation.

Moreover, after an alarming state is cancelled by inserting a key into and drawing it from key cylinder 2C three times as described above, control unit 7 can store the alarming state before alarm unit 1, such as flashing of lamps 1A and sounding buzzer 1B, is turned off. Then, a predetermined operation of movable body 2, such as opening/closing a door three times successively, can restore the alarming state before cancellation. This can easily set an alarm unit again after the alarm unit has been turned off once.

Further, the system can be structured so that the same operation of a predetermined movable body 2 allows control unit 7 to sequentially change the alarming states. For example, operating door knob 2 two times successively lights lamps 1A. Operating door knob 2 two times after a while sounds buzzer 1B. Operating door knob two times after a while again blows horn 1C. In this case, because a user need not remember various kinds of operations and corresponding alarming states, the alarming states can more easily be changed.

Figure 4:
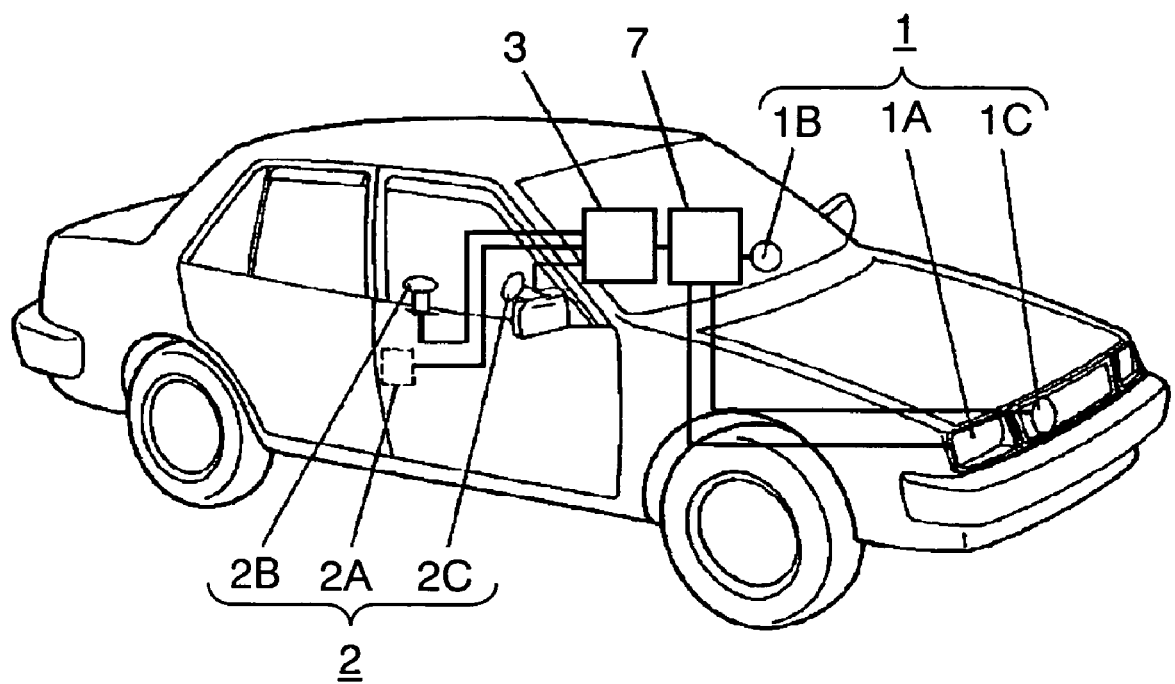
FIG. 4 is a diagram showing how the vehicular burglar-proof system of the present invention is installed in an automobile.
Figure 5:
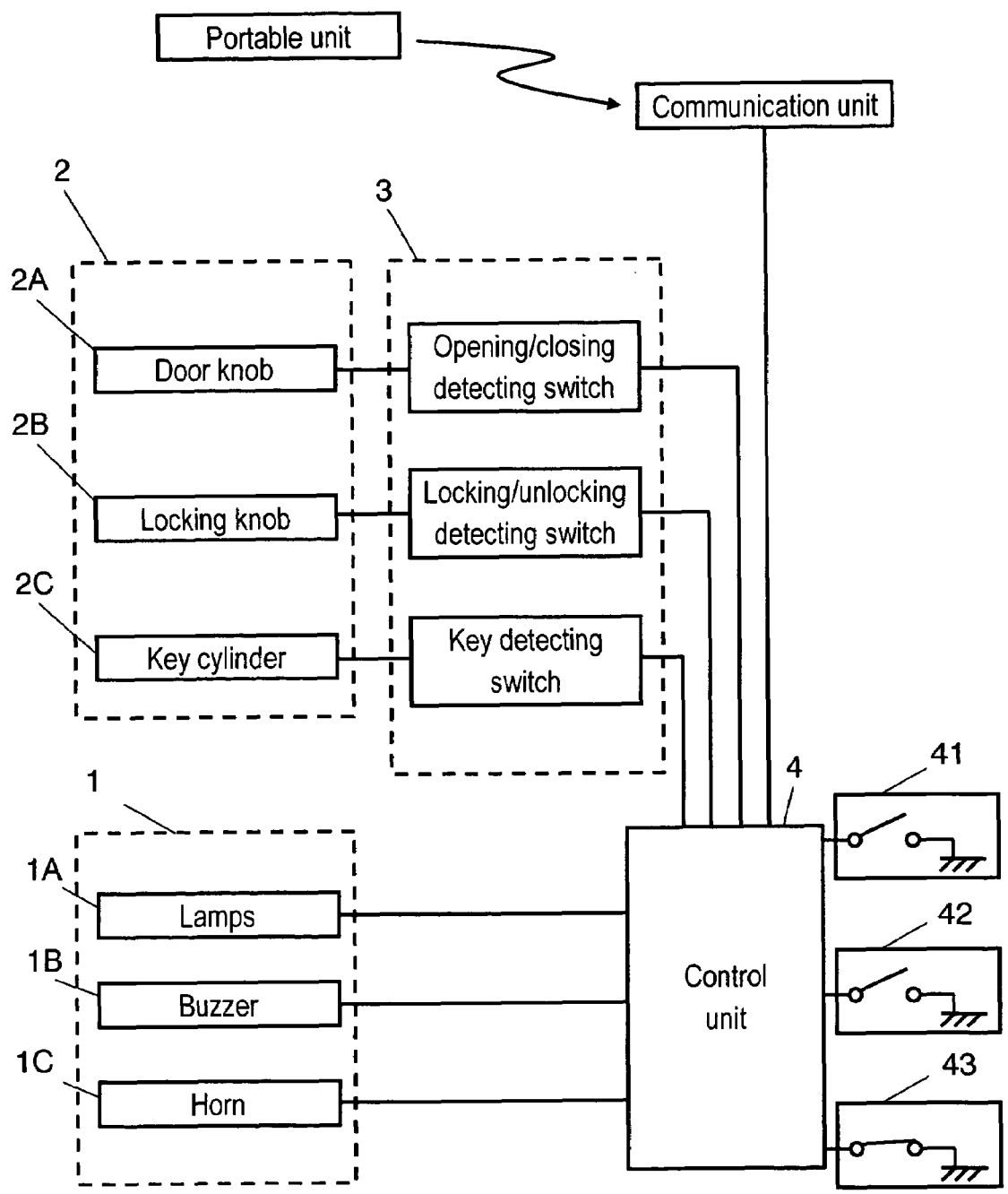
FIG. 5 is a block diagram of a conventional vehicular burglar-proof system.

FIG. 4 is a diagram showing how a vehicular burglar-proof system of the present invention is installed in an automobile. Door knob 2A, locking knob 2B, and key cylinder 2C are disposed in positions in which a driver can easily operate. However, control unit 7 can be disposed in a position inaccessible to a driver. To control unit 7 of a vehicular burglar-proof system of the present invention, changeover switches for selection of the alarming states is not added. For this reason, the driver need not operate control unit 7.

As described above, a vehicular burglar-proof system of the present invention can achieve a user-friendly vehicular burglar-proof system with a simple structure in which an alarming state can easily be selected. This vehicular burglar-proof system is useful for preventing theft mainly in an automobile.

What is claimed is:

1. A vehicular burglar-proof system comprising:
   a plurality of alarm units configured to indicate an alarm has been activated;
   a detection unit for detecting movement, opening, and closing of at least one of a plurality of movable bodies; and
   a control unit coupled to the plurality of alarm units and the detection unit;
   wherein a predetermined operation of the at least one of the plurality of movable bodies allows the control unit to select one of the plurality of alarm units to indicate a predetermined alarming state.

2. The vehicular burglar-proof system of claim 1, wherein a predetermined operation of the at least one of the plurality of movable bodies allows the control unit to select one or more of the plurality of alarm units such that a combination of the selected alarm units indicates a predetermined alarming state.

3. The vehicular burglar-proof system of claim 1, wherein the control unit stores an alarming state before the plurality of alarm units are turned off, and a predetermined operation of the at least one of the plurality of movable bodies restores the alarming state before the plurality of alarm units are turned off.

4. The vehicular burglar-proof system of claim 1, wherein a predetermined operation of the at least one of the plurality of movable bodies allows the control unit to sequentially change an alarming state.

5. The vehicular burglar-proof system of claim 1, wherein a second predetermined operation of the at least one of the plurality of movable bodies allows the control unit to turn off the plurality of alarm units.

6. The vehicular burglar-proof system of claim 5, wherein if one of the plurality of the movable bodies sequentially comes into a predetermined condition and comes out from the predetermined condition, the alarming state is canceled.

7. The vehicular burglar-proof system of claim 1, wherein if while one of the plurality of the movable bodies is kept in a predetermined condition, another of the plurality of the movable bodies is operated a predetermined number of times successively, then one of the plurality of alarm units corresponding to the predetermined number of times is selected.

8. The vehicular burglar-proof system of claim 2, wherein if while one of the plurality of the movable bodies is kept in a predetermined condition, another of the plurality of the movable bodies is successively operated a predetermined number of times, then said ones of the plurality of alarm units corresponding to the predetermined number of times is selected.

9. The vehicular burglar-proof system of claim 1, wherein at least one of the plurality of movable bodies is one of a door knob, a locking knob, and a key cylinder.

10. The vehicular burglar-proof system of claim 2, wherein the plurality of movable bodies include a door knob, a locking knob, and a key cylinder.

11. The vehicular burglar-proof system of claim 5, wherein the at least one of the plurality of movable bodies is a key cylinder.

* * * * *